Patented Sept. 20, 1949

2,482,594

UNITED STATES PATENT OFFICE 2,482,594

METHOD OF PREPARING PHENOLIC MATERIALS FROM LIGNIN

Irwin A. Pearl and Louis E. Wise, Appleton, Wis., assignors, by mesne assignments, to The Institute of Paper Chemistry, a corporation of Wisconsin No Drawing. Application April 1, 1946,
Serial No. 658,878

4 Claims. (Cl. 260—600)

Our invention relates to the processing of woody materials and includes among its objects and advantages a separation between the holocellulose ingredients of the same, and the other ingredients, which are chiefly, or almost entirely, lignin, and the subsequent processing of these other ingredients to secure useful products.

Lignin, in the various closely similar forms in which it occurs in various types of woody plants, is known to be of the nature of a polymer. To such a compound no definite molecular weight can be assigned, because the individual polymerized groups vary in size. The best approximation that can be made is to assign an approximate average of molecular weight to a given sample at a given time. But even that value may no longer be valid after the sample has been dissolved, or subjected to mild heating, because very little treatment may under certain conditions cause the group to rupture into smaller groups or to combine into larger ones.

The lignins commonly known may be partly or wholly broken down or degraded in various ways to produce individual definitive compounds or groups of uniform molecular weight and determinable molecluar structure. It is generally assumed that at least the nuclear portions of such fragments are present in the original polymer, although presumably with slightly altered substituents, or associated atoms or groups at one or more points. The valuable definitive compounds we have so far obtained in this way include guaiacyl, (3 methoxy-4-hydroxy-phenyl) syringyl, (3,5-dimethoxy - 4 - hydroxy-phenyl), and 4-hydroxy-phenyl derivatives, which occur in varying proportions depending on the kind of plant from which the lignin was obtained. Most of these definitive fragments are obtained as monomers, or compounds containing but a single ring, although in some instances equally definitive compounds may be isolated, which contain more than one aromatic ring, but are also of greater usefulness and value than the original polymer found in the plant.

According to one form of the invention the entire woody structure is subjected to treatment with sodium chlorite to dissolve out all the lignin content.

According to another embodiment, lignin separated from wood by any suitable process according to the prior art, is subjected to reaction with the same reagent, and substantially the same final products result as in the case of treating the entire wood.

In both embodiments, best results have been obtained so far with the sodium chlorite kept at a pH of about 3.0 to 6.5.

EXAMPLE 1

*Chlorite treatment of entire wood*

A suspension of 200 parts finely devided (sawdust or small wood chips) unextracted black spruce wood (*Picea mariana*) (containing approximately 50 parts of lignin) in 6400 parts of water containing 60 parts of sodium chlorite and 20 parts of glacial acetic acid was heated with occasional agitation at atmospheric pressure at 70-80° C. for one hour. Chlorine dioxide was evolved slowly and reacted gradually with the lignin, the course of the reaction being followed readily by the color changes in the wood, which changes are a gradual loss of whatever coloration there was in the original wood, finally reaching a pure white color. At the end of the first hour, without cooling, 20 parts of glacial acetic acid were added directly to the mixture followed by the gradual addition of 60 parts of sodium chlorite. The suspension was then thoroughly mixed and the heating was continued another hour at 70-80° C. The entire treatment was repeated twice more employing a total of 240 parts of sodium chlorite and 80 parts of glacial acetic acid. At the end of the final period the wood residue was white and retained the original woody structure. The suspension was cooled in an ice bath, filtered by suction through a coarse sintered glass funnel, and washed with ice water. The residue on the funnel was the holocellulose (non-lignin) content of the wood.

The clear yellow filtrate and washings which contained the chlorited reaction products of lignin (and the small amount of extractives) originally present in the wood were aspirated with air to remove dissolved chlorine dioxide and then acidified with dilute sulfuric acid to change the acetates to sulphates and free the acetic acid for recoverey and re-use. A pH of about 2.0 has been found satisfactory for this. This caused the separation of considerable amount of light cream-colored solid. The complete mixture was concentrated to approximately 2500 parts by distillation under reduced pressure.

The distillate was extracted with ether and the ether extract was distilled on the water bath at atmospheric pressure to remove the ether. The residue, containing acetic acid, was further distilled under reduced pressure to remove acetic acid, leaving 2 parts of steam distillable products as an almost colorless oil of which 1.5 parts were phenols and 0.5 part were neutrals.

The original concentrated distillation residue, containing much cream-colored precipitate, was filtered and, washed with water and finally with ether. The aqueous filtrate and washings were thoroughly extracted with ether. This ether extract contained most of the simple products, which include chemical compounds of several different types. The ether extract was extracted successively with an aqeous sodium bisulfite solution (about 21%) to remove the aldehyde fraction, a saturated aqueous sodium bicarbonate solution to remove the acidic fraction, and an aqueous sodium hydroxide solution (about 5%) to remove the phenolic fraction. The residual ether upon evaporation yielded about 3 parts of neutral material as a colorless oil insoluble in alcohol and with a characteristic odor like banana oil.

The bisulfite solution was further acidified with sulfuric acid, and the acid solution containing considerable yellow precipitate was aspirated to remove dissolved sulfur dioxide and extracted with ether. The ether was dried and distilled to give about 6 parts of a crystalline aldehyde fraction which was identified as 6-chlorovanillin. In addition, about 1.5 parts of an unidentified ether insoluble, alcohol and acetone soluble aldehyde fraction was obtained.

The bicarbonate solution was acidified with sulfuric acid causing the separation of a yellow precipitate. The mixture was extracted with ether, and the ether was dried and distilled to yield about 4.5 parts of an acid fraction as a very viscous light yellow oil.

The sodium hydroxide solution was worked up in the same manner as the bicarbonate solution and yielded about 1.5 parts of a phenol fraction as a viscous yellow oil.

The cream-colored precipitate after the ether washings (see above) amounted to approximately 15 parts. Analysis indicated that it contained one chlorine atom for every methoxyl group. This material is very suitable for use as a starting material in lignin decomposition processes. It is believed to be a chlorolignin product in an intermediate stage of degradation, or depolymerization.

With certain hardwoods and more especially raw materials from annual plants in place of the softwood, black spruce, in the above example, practically complete delignification of the material takes place in three chlorite treatments, instead of the four needed to complete the treatment of black spruce.

Example 2

Chlorite treatment of isolated lignin

A suspension of 200 parts of powdered isolated softwood soda lignin in 15,000 parts of water containing 300 parts of glacial acetic acid was heated 70–80° C. and with agitation was treated slowly with a solution of 400 parts of sodium chlorite in 15,000 parts of water over a period of several hours. Heating at 70–80° C. was continued for a total of 5 hours before all the lignin disappeared and a clear yellow solution was obtained. The clear solution was aspirated to remove dissolved chlorine dioxide and then further acidified with dilute sulfuric acid to a pH of about 2.0. This caused the separation of a light colored precipitate. The complete mixture was concentrated to approximately 10,000 parts under reduced pressure. The residue and distillate were treated as in Example I and yielded the same products in substantially the same yields (calculated on the amount of lignin).

All types of lignin appear to be suitable for use in this process. Gymnosperms, especially the conifers such as spruce, hemlock, pine, fir, etc., and angiosperms including the dicotyledons such as maple, aspen, oak, beech, etc., and the monocotyledons such as corn (cobs and stalks), bamboo, sugar cane (bagasse), and rye straw, etc., in their original form or in the form of their isolated lignin products, may be employed. The products obtained from the gymnosperms are predominantly guaiacyl (4-hydroxy-3-methoxyphenyl) derivatives whereas the products obtained from the angiosperms are predominantly guaiacyl and syringyl (4-hydroxy-3,5-dimethoxyphenyl) derivatives. In the case of the monocotyledons such as corn (cobs and stalks), bamboo, rye straw, etc., 4-hydroxyphenyl derivatives are obtained in addition to guaiacyl and syringyl derivatives.

All types of isolated lignins including basic lignosulfonates, kraft lignin, alkali lignin, fermented waste liquor, Scholler lignin, etc., appear to be suitable.

The process proceeds without the formation of oxalic acid, and the mode of addition of the sodium chlorite appears to be not critical. This procedure differs from oxidative lignin treatments previously known to us in that in the earlier treatments the presence of cellulose or holocellulose or their products of decomposition or transformation, interfered with the process to the extent that they also were more or less oxidized and thus used up and exhausted the reagents employed. And in most of these previous oxidations more or less of the lignin itself was lost by becoming oxidized to oxalic acid.

Without further elaboration the foregoing will so fully explain the invention that others may readily adapt the same for use under various conditions of service. It will, for instance, be obvious that the acetic acid specified in the examples is merely a matter of controlling the acidity and that many other equivalents will serve equally well. We ourselves have achieved satisfactory results with sodium bisulfate also.

As at present advised with respect to the apparent scope of our invention, we desire to claim the subject matter of the following claims and equivalents thereof.

We claim:

1. The method of preparing phenolic materials which comprises reacting a lignin substance with sodium chlorite in a hot, weakly acid, aqueous reaction mixture until the lignin goes into solution, acidifying the lignin solution to a pH of about 2, extracting the acidified mixture with a water-immiscible solvent and recovering the phenolic materials from the extract.

2. The method of preparing phenolic materials which comprises reacting isolated lignin with sodium chlorite in a hot, weakly acid, aqueous reaction mixture until the lignin goes into solution, acidifying the lignin solution to a pH of about 2, extracting the acidified mixture with a water-immiscible solvent and recovering the phenolic materials from the extract.

3. The method of preparing phenolic materials which comprises reacting isolated soda lignin with sodium chlorite in a hot, weakly acid, aqueous reaction mixture until the lignin goes into solution, acidifying the lignin solution to a pH of about 2, extracting the acidified mixture with a water-immiscible solvent and recovering the phenolic materials from the extract.

4. The method of preparing 6-chlorovanillin which comprises reacting a lignin substance with sodium chlorite in a hot, weakly acid, aqueous reaction mixture until the lignin goes into solution, acidifying the lignin soluton to a pH of about 2, extracting the acidified mixture with a water-immiscible solvent and recovering the 6-chlorovanillin from the extract.

IRWIN A. PEARL.
LOUIS E. WISE.

REFERENCES CITED

The following references are of record in the file of this patent:

UNITED STATES PATENTS

| Number | Name | Date |
|---|---|---|
| 2,057,117 | Sandborn et al. | Oct. 13, 1936 |
| 2,417,346 | Brauns et al. | Mar. 11, 1947 |
| 2,433,227 | Lewis et al. | Dec. 23, 1947 |

FOREIGN PATENTS

| Number | Country | Date |
|---|---|---|
| 46,189 | Sweden | Mar. 21, 1918 |

OTHER REFERENCES

Jayme, G.: Celluloschemie, vol. 20, No. 2, pages 43 to 49 (Mar.–Apr. 1942).

Pearl, I. A.: "Vanillin from lignin materials," J. Am. Chem. Soc., June 1942, pages 1429–1431.

Chemical Abstracts (1943), vol. 37, page 1865, abstracting Sohn et al., Papier-Fabr., 40, 1–7, 105–12 (1942); ibid., (1944), vol. 38, page 251, abstracting Jayme et al., Naturwissenschaften, 31, 275–6 (1943).